US00RE38184E

(19) United States
(12) Reissued Patent
Träger

(10) Patent Number: US RE38,184 E
(45) Date of Reissued Patent: Jul. 15, 2003

(54) CIRCUIT FOR DISPLAYING OPERATING STATES OF A DEVICE

(75) Inventor: Dietmar Träger, Dresden (DE)

(73) Assignee: Infineon Technologies AG, Munich (DE)

(21) Appl. No.: 09/826,279

(22) Filed: Apr. 4, 2001

Related U.S. Patent Documents

Reissue of:
(64) Patent No.: 6,115,010
Issued: Sep. 5, 2000
Appl. No.: 09/253,856
Filed: Feb. 22, 1999

U.S. Applications:

(63) Continuation of application No. PCT/DE97/01780, filed on Aug. 18, 1997.

(30) Foreign Application Priority Data

Aug. 20, 1996 (DE) ..... 196 33 550

(51) Int. Cl.[7] ..... G09G 3/14
(52) U.S. Cl. ..... 345/46; 340/762; 345/30
(58) Field of Search ..... 345/30, 33–35, 345/39, 44, 46, 48, 82; 340/762, 825.82, 815.45, 815.63, 901, 907; 348/801; 362/545, 800; 437/23, 127

(56) References Cited

U.S. PATENT DOCUMENTS 4,837,565 A * 6/1989 White ..... 340/762
5,256,948 A * 10/1993 Boldin et al. ..... 315/313

FOREIGN PATENT DOCUMENTS

DE 2752987 * 5/1979
DE 3304052 A1 * 9/1983
DE 3224586 A1 * 1/1984
FR 2554943 A1 * 5/1985

OTHER PUBLICATIONS

"Tri–Color LED Drive System", IBM Technical Disclosure Bulletin, Jun. 1986.*
"Das CMOS–Kochbuch", IWT–Verlag GmbH, Vaterstetten, pp. 16–19.*

* cited by examiner

*Primary Examiner*—Bipin Shalwala
*Assistant Examiner*—Jimmy H. Nguyen
(74) *Attorney, Agent, or Firm*—Laurence A. Greenberg; Werner H. Stemer; Gregory L. Mayback

(57) ABSTRACT

A circuit receives at least two input signals and produces exactly three output signals in response to the two input signals, whereby two of the output signals shine constantly in an activated state and the third output signal shines constantly or flashes in the activated state. Each time exactly one of the three output signals is activated.

4 Claims, 2 Drawing Sheets

CIRCUIT FOR DISPLAYING OPERATING STATES OF A DEVICE

Figure 1:
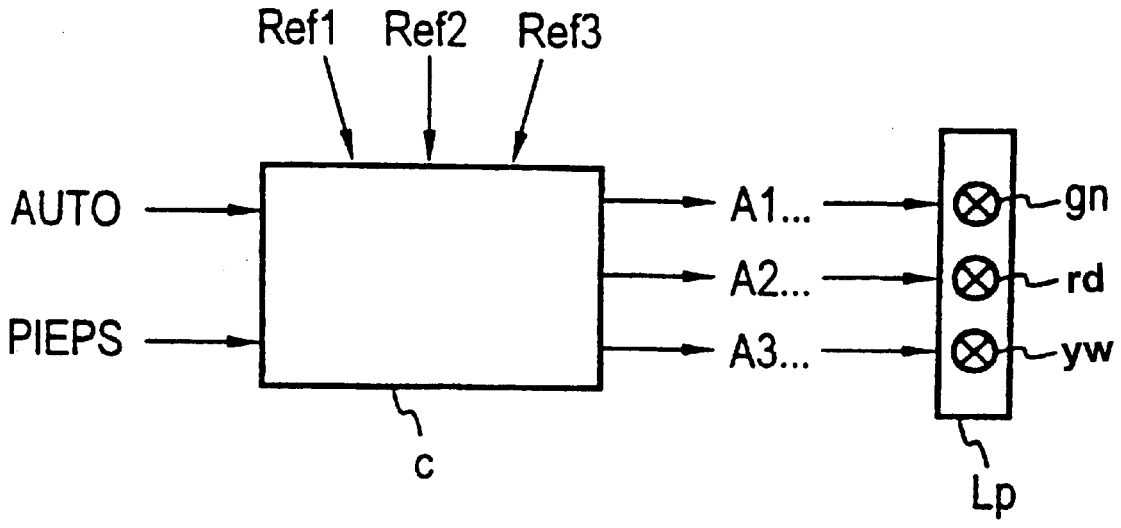

Matter enclosed in heavy brackets [ ] appears in the original patent but forms no part of this reissue specification; matter printed in italics indicates the additions made by reissue.

CROSS-REFERENCE TO RELATED APPLICATION

This is a continuation of International Application PCT/DE97/01780, filed Aug. 18, 1997, which designated the United States.

BACKGROUND OF THE INVENTION

Field of the Invention

The invention relates to a circuit for displaying operating states of a device.

Modern production processes mostly proceed in a highly automated way. However, it is frequently necessary in this case for the intermediate products, which arise in the individual production steps and are to be further processed, to be removed from a device and be transported further, and for a device following on in the production process to be charged with them. A similar situation applies to the beginning and end of a process: the device used in the production process as the first machine must be charged, and the device used in the production process as the last machine must be discharged. Furthermore, investigations of a random sample nature are also frequently carried out on the respective intermediate products between two production steps, for example in order to be able to ensure the quality of the products to be produced, and/or to be able to determine any deviations from stipulated values which occur in the production process.

Common to all these operations is the need to be able to visualize in some form or other specific operating states in which the respective devices are to be found. For example in the form of optical and/or acoustic signals for operators, or in the form of electric signals which can be automatically further processed, for example by connected computers or controllers for further devices.

A device described in Published, Non-Prosecuted German Patent Application DE 32 24 586 A1 relates to an apparatus for acquiring operating data, which has a display panel via which maintenance staff, for example, make statements referring to operability and further processing of operating data.

Published, Non-Prosecuted German Patent Application DE 33 04 052 A1 sets forth a signaling unit for operating state signals and having a central control device and a plurality of signaling devices connected thereto. The control device generates output signals that specify an operating state.

Published, Non-Prosecuted German Patent Application De 27 52 987 A1 describes a switching configuration for displaying different optical characteristics by display elements disposed on subscriber apparatuses of a telecommunications system. A memory section, a read-out circuit and a demultiplexer are required. Eight address signals serve to drive eight output signals, it being possible to generate four states per output line (for example "Off", "slow flickering", "fast flickering", "permanently lit").

As shown in the text book by Don Lancaster and entitled "Das CMOS-Kochbuch"["The CMOS Cook Book"), IWT-Verlag GmbH, Vaterstetten, it is also possible in principle to have recourse to known elementary exemplary circuits such as 1- from-4 decoders etc. when configuring simple generic circuits for signal processing.

SUMMARY OF THE INVENTION

It is accordingly an object of the invention to provide a circuit for displaying operating states of a device that overcomes the above-mentioned disadvantages of the prior art devices of this general type, which detects operating states of a device and provides information on the operating states in a suitable way for further use.

With the foregoing and other objects in view there is provided, in accordance with the invention, an apparatus for displaying operating states of a device, including: a circuit having two input terminals receiving two input signals and three output terminals outputting three output signal including a first output signal, a second output signal and a third output signal each having an activated state and a deactivated state derived from the two input signals; the circuit is configured such that in each case exactly one of the three output signals is activated; during the activated state of the first output signal, the first output signal has a first effective value exceeding a value of a given first reference potential; during the activated state of the second output signal, the second output signal has a second effective voltage value exceeding a value of a given second reference potential; and during the activated state of the third output signal, the third output signal has a value being one of: a third effective voltage value exceeding a value of a given third reference potential; and the third effective value during a first time period, and a fourth effective value that is less than the value of the third reference potential during a second time period, the first time period and the second time period being repeated while the third output signal is in the activated state.

In the case of the circuit according to the invention, it is advantageous to be able to use as input signals of the circuit, signals that are already present in the device whose operating state is to be detected. Furthermore, it is advantageous to be able to indicate the operating state as simply as possible. In this case, it is possible to use further devices for the purpose of indication such as, for example, a computer, acoustic devices such as horns or optical devices, for example in the form of traffic lights. The latter case serves, in particular, to inform operating, maintenance and/or repair staff.

In accordance with an added feature of the invention, at least two of the first effective value, the second effective value, and the third effective value are equal.

In accordance with an additional feature of the invention, at least two of the given first reference potential, the given second reference potential and the given third reference potential are equal.

In accordance with a concomitant feature of the invention, the three output terminals include a third output terminal, and a duration of each of the first time period and the second time period is long enough for reliably detecting and displaying the third effective value and the fourth effective value on a display device that can be connected to the third output terminal and receives the third output signal.

Other features which are considered as characteristic for the invention are set forth in the appended claims.

Although the invention is illustrated and described herein as embodied in a circuit for displaying operating states of a device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
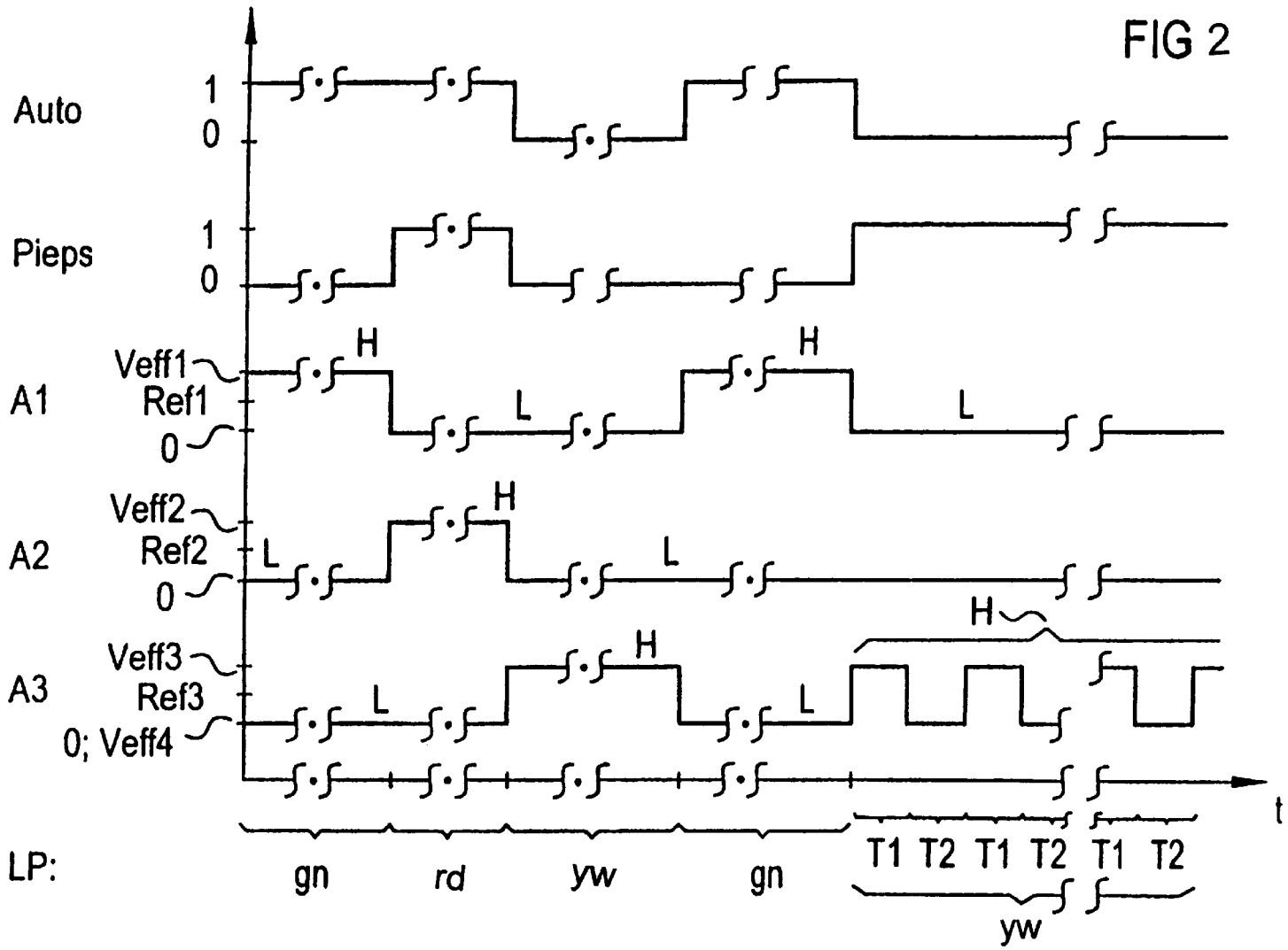

FIG. 1 is a diagrammatic block circuit diagram of a circuit C with a display unit Lp connected thereto according to the invention; and FIG. 2 is a timing diagram which represents input and output signals of the circuit C and their relation to one another, by way of example.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a circuit C according to the invention that has two input signals AUTO and PIEPS. The circuit C provides at its outputs three output signals A1, A2, A3 which can, for example, be fed to a display unit Lp in a form of traffic lights whose lamps gn, rd, yw light up in accordance with the output signals A1, A2, A3. A possible sequence, assumed for this exemplary embodiment, of the input and output signals AUTO, PIEPS, A1, A2, A3 is represented diagrammatically in FIG. 2. Neither the temporal sequence of the signals nor their electric levels are represented to scale.

Assuming (arbitrarily) that one input signal AUTO always assumes its active state (denoted by "1" in FIG. 2) when the device whose operating state is to be displayed takes up its regular operation (for example by manual actuation of a starting button or the like), and goes over into its inactive state (denoted by "0" in FIG. 2) only when either the device has regularly finished its prescribed work step, or when regular operation is broken off from outside (for example by maintenance staff). It is assumed for the other input signal PIEPS that it is always inactive (denoted by "0" in FIG. 2), with the exception of the following two cases:

a) a fault occurs in the working sequence of the device, or b) the prescribed work steps have been ended regularly.

In both these cases, the input signal PIEPS is in its activated state (denoted by "1" in FIG. 2).

It is assumed, for example, for the output signals A1, A2, A3 that they drive lamps gn, rd, yw of the display unit Lp. The first output signal A1 driving the lamp gn, the second output signal A2 driving the lamp rd, and the third output signal A3 driving the lamp yw. On the basis of the implementation, assumed by way of example, of the circuit C, effective values Veff1, Veff2, Veff3, Veff4 mentioned further below with reference to the activated states H of the output signals A1, A2, A3 are constant electric potentials. However, since it is also conceivable to have refinements of the circuit C in which the output signals A1, A2, A3 could, for example, be pulse code modulated or frequency modulated signals, the activated states H are denoted as effective values Veff1, . . . , Veff4.

FIG. 2 shows the signal sequences at the inputs and the outputs of the circuit C for an assumed process sequence and with reference to the display unit Lp, which is activated to display on the basis of the output signals.

At the start of the process sequence, one input signal AUTO is activated ("1"), and the other input signal PIEPS is deactivated ("0"). This situation corresponds to a regular operation of the device whose operating state is to be displayed.

Only the first output signal A1 is in its activated state H, with a first effective value Veff1 which is higher than a first reference potential Ref1, and only the green lamp gn shines (in continuous operation) as long as there is no change in the state of the two input signals AUTO, PIEPS. However, some sort of malfunction is then assumed to occur at the device, which the device detects. While one input signal AUTO remains activated without change ("1"), the other input signal PIEPS is now also activated ("1"), with the result that both input signals AUTO, PIEPS are activated. In this case, the first output signal A1 assumes a deactivated state L, and the green lamp gn goes out. The second output signal A2 assumes an activated state with a second effective value Veff2 which is higher than a second reference potential Ref2, and it is only the red lamp rd which shines, since the third output signal A3 maintains its deactivated state L.

If now, for example, in order to rectify the fault, a maintenance technician puts the device into a state which can be denoted as "standby", "manual operation" or the like (that is to say if he deliberately ends the automatic operation of the device), both input signals AUTO, PIEPS become inactive ("0"). In this case, the first output signal A1 maintains its deactivated state L, the second output signal A2 goes over into its deactivated state L, and the third output signal A3 assumes the activated state H.

In this case, the third output signal A3 has a third effective value Veff3 which is higher than the value of a third reference potential Ref3. The third reference potential Ref3 is dimensioned such that the lamp yw shines whenever the third output signal A3 has a effective value which is higher than the third reference potential Ref3. Therefore, in the concrete case that (only) the yellow lamp yw shines uninterruptedly as long as the described state continues.

If, after termination of the maintenance or repair work, the device again takes up its regular process sequence (through the pressing of a "start", "automatic" button or the like), the input signal AUTO (again) assumes its active state "1", while the input signal PIEPS remains inactive ("0"). As a result, the third output signal A3 is also deactivated (state L), and the yellow lamp yw goes out. Whereas the second output signal A2 remains deactivated (state L), the first output signal A1 is re-activated (state H), with the result that it is now only the green lamp gn which shines.

After an undisturbed sequence of the process taking place in the device, upon termination of this process the first input signal AUTO goes over into its inactive state L, while the second input signal PIEPS goes over into its active state H. As a result, the first output signal A1 again assumes its deactivated state L, while the already present deactivated state L of the second output signal A2 is maintained. The third output signal A3, by contrast, assumes its activated state H. With this configuration of the input signals AUTO, PIEPS, the effect now on the activated state H of the third output signal A3 is, by contrast with the previously described case ("standby operation"), in which the yellow lamp yw shines uninterruptedly, that is has the third effective value Veff3 in a first period T1, while following thereupon it has for a second period T2 a fourth effective value Veff4 which is below the value of the third reference potential Ref3 (typically the value of the reference potential of the entire circuit, mostly likely ground). The yellow lamp yw therefore goes out. After expiry of the second period T2, the activated state H of the third output signal A3 reassumes for the duration of the first period T1 the third effective value Veff3, and following thereupon again assumes the fourth effective value Veff4 for the second period T2, etc. The durations of these two periods T1, T2 are determined or can be determined. This activated state of the third output signal A3, which causes the yellow lamp yw to flash, continue as long as there is no change in the state of the two input signals AUTO, PIEPS. The first three effective values Veff1, Veff2, Veff3 of the activated states H of the three output signals A1, A2, A3 can differ from one another entirely or partially. However, according to the invention they can also be entirely or partially the same.

In a corresponding way, the reference potentials Ref1, Ref2, Ref3 can also be entirely or partially the same. Furthermore, it is favorable that each of the two periods T1, T2 lasts in each case at least until it is possible for a display device Lp connected to the third output signal A3 reliably to detect the respective presence of a third and fourth effective values Veff3, Veff4 and display it. This is important, in particular, whenever the display unit Lp is a traffic light with display lamps whose displays are to be observed by humans ("inertia of the human eye").

I claim:

1. An apparatus for displaying operating states of a device, comprising:

a circuit having two input terminals receiving two input signals and three output terminals outputting three output signals including a first output signal, a second output signal and a third output signal each having an activated state and a deactivated state derived from the two input signals;

said circuit configured such that in each case exactly one of said three output signals is activated;

during said activated state of said first output signal, said first output signal having a first effective value exceeding a value of a given first reference potential;

during said activated state of said second output signal said second output signal having a second effective voltage value exceeding a value of a given second reference potential; and during said activated state of said third output signal, said third output signal having a value being one of:

a third effective voltage value exceeding a value of a given third reference potential; and said third effective value during a first time period, and a fourth effective value being less than the value of the third reference potential during a second time period, said first time period and said second time period being repeated while said third output signal is in said activated state.

2. The apparatus for displaying operating states according to claim 1, wherein at least two of said first effective value, said second effective value, and said third effective value are equal.

3. The apparatus for displaying operating states according to claim 1, wherein at least two of the given first reference potential, the given second reference potential and the given third reference potential are equal.

4. The apparatus for displaying operating states according to claim 1, wherein said three output terminals include a third output terminal, and a duration of each of said first time period and said second time period is long enough for reliably detecting and displaying said third effective value and said fourth effective value on a display device that can be connected to said third output terminal and receiving said third output signal.

* * * * *